United States Patent [19]

Schiessle et al.

[11] Patent Number: 4,805,466

[45] Date of Patent: Feb. 21, 1989

[54] DEVICE FOR THE CONTACTLESS INDIRECT ELECTRICAL MEASUREMENT OF THE TORQUE AT A SHAFT

[75] Inventors: Edmund Schiessle, Schorndorf; Khaldoun Alasafi, Schwaebisch-Gmuend, both of Fed. Rep. of Germany

[73] Assignee: Daimler-Benz Aktiengesellschaft, Stuttgart, Fed. Rep. of Germany

[21] Appl. No.: 108,442

[22] Filed: Oct. 15, 1987

[30] Foreign Application Priority Data

Oct. 16, 1986 [DE] Fed. Rep. of Germany ....... 3635207

[51] Int. Cl.[4] .............................................. G01L 3/10
[52] U.S. Cl. .............................. 73/862.36; 73/DIG. 2
[58] Field of Search ................ 73/862.36, 862.69, 779, 73/DIG. 2; 324/209

[56] References Cited

U.S. PATENT DOCUMENTS 3,861,206  1/1975  Kawafune et al. ............. 73/DIG. 2
4,416,161 11/1983  Barkhoudarian ................ 73/862.36

FOREIGN PATENT DOCUMENTS 2316344 10/1973  Fed. Rep. of Germany .
3407917  9/1985  Fed. Rep. of Germany .

Primary Examiner—Charles A. Ruehl
Attorney, Agent, or Firm—Barnes & Thornburg

[57] ABSTRACT

A device for the contactless indirect electrical measurement of the torque at a shaft utilizing the Matteucci effect in which the shaft is located in an induced magnetic direct-axis field. Upon torsion of the shaft, the change in magnetization in the shaft itself is not measured, but rather a measuring layer applied to the shaft is metrologically detected by the device. In order to avoid disturbing influences from the basic magnetization of the shaft on the measuring layer, a further layer is applied to the shaft, which short-circuits the magnetic flux resulting from the basic magnetization of the shaft, the measuring layer being magnetically decoupled from the inner layer by a highly nonmagnetic layer between the inner, further layer and the measuring layer.

6 Claims, 1 Drawing Sheet

DEVICE FOR THE CONTACTLESS INDIRECT ELECTRICAL MEASUREMENT OF THE TORQUE AT A SHAFT

SUMMARY OF THE INVENTION

The present invention relates to a device with which the mechanical stresses proportional to the torque to be transferred can be sensed at a rotating shaft, in particular, a soft magnetic shaft.

Every soft magnetic material, for example that of a shaft, has a greater or lesser basic magnetisation, depending on its mechanical pre-history This basic magnetisation changes, among other reasons, under mechanical loading, and with the aging of the material. So if, utilising the so-called "Matteucci effect", according to which a ferromagnetic rod located in an induced magnetic direct-axis field changes its magnetisation upon torsion, these changes in magnetisation were to be detected with the aid of a corresponding magnetic field sensor system, in this way, statements with respect to the mechanical stresses occurring in the shaft can be obtained. However, these statements would have to be assessed appropriately relativised as they may be influenced and falsified by the basic magnetisation itself and the indefinite change in the basic magnetisation of the material of the shaft.

A device of the above-described type is shown in German Published Unexamined Patent Application No. 2,316,344, in which a layer of nonmagnetic material is applied to a soft magnetic shaft, and to this layer in turn a layer with good magnetostriction properties is applied. The nonmagnetic layer in this case has to fulfill the purpose of insulating the shaft magnetically from the outer layer, through which the entire magnetic flux is to be conducted, this flux being generated by an alternating current-fed magnetising coil and a change in magnetic flux being detected by a detector coil on the transformer principle. Although an insulation is provided here between the applied measuring layer and the shaft, the instable basic magnetisation of the shaft under dynamic loading still leads to a falsification of the measured result since the magnetic field of the magnetised shaft also strays into the measuring layer.

An object of the present invention is to provide a device for contactless indirect electrical measurement of torque at a shaft in which unfalsified measuring signals which are reliable and stable in the long term are obtained even in continuous operation under high mechanical alternating loads and under physically and chemically aggressive ambient conditions.

This and other objects of the invention are achieved in a device for the contactless indirect electrical measurement of torque at a shaft having a sensor system which is arranged a small distance from the shaft, this sensor system having a U-shaped magnetic field generator and at least one sensor having a core and a coil with electrical connections, and an evaluation circuit in which a first sensor is integrated via these connections. The device includes a plurality of coatings fixed on the shaft in the area of the sensor system, these coatings including a highly soft magnetic, magnetostrictive amorphous first layer for causing a magnetic direct-access field generated by the magnetic field generator to be conducted in longitudinal direction of the shaft for closing of a magnetic circuit. The sensor is arranged in the area of the direct-access field conducted through the first layer, and upon torsion of the shaft, detects a change in magnetisation in the first layer and a form of a change of the magnetic flux in its sensor core. A second layer underlies the first layer and is highly nonmagnetic, while a third layer is a highly permeable nonmagnetostrictive, amorphous layer on which the second layer lies, this third layer being applied directly on the shaft.

The core is in the magnetic circuit and comprises nonmagnetostrictive amorphous metal. The magnetic field generated by the magnetic field generator is a direct-current field which is superimposed on an alternating-current field generated by the excited coil so that a change in the magnetic flux affects the change in the dynamic permeability of the core by a non-linear function $B = f(H)$ of the magnetisation curve and as a consequence of the inductance of the coil, this change being converted in the evaluation circuit in a torsion-analogous electrical signal.

Other objects, advantages and novel features of the present invention will become apparent from the following detailed description of the invention when considered in conjunction with the accompanying drawings.

DETAILED DESCRIPTION OF THE DRAWINGS

Figure 1:
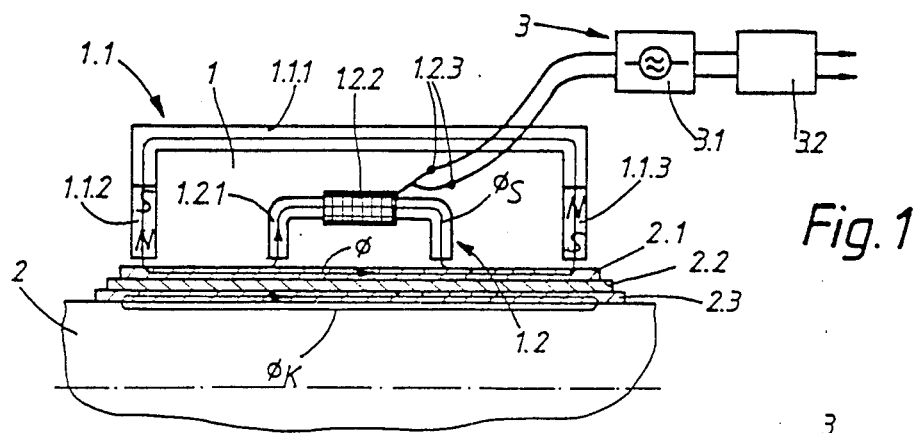
FIG. 1 is a diagrammatic representation of a preferred embodiment of the present invention.

The action principle of the device is based on the known "Matteucci effect" if a soft magnetic rod located in a magnetic direct-axis field is twisted, its magnetisation changes. With reference to the embodiment of FIG. 1, the device comprises a sensor system 1 and coatings 2.1, 2.2 and 2.3 arranged on the soft magnetic shaft 2, this shaft 2 being the object of measurement.

The sensor system 1 includes a U-shaped magnetic field generator 1.1 extending in the longitudinal direction of the shaft 2 and formed by a U-shaped soft magnetic yoke 1.1.1 with permanent magnets 1.1.2 and 1.1.3 arranged at the ends of its arms facing the shaft 2. The sensor system 1 also includes a sensor 1.2, which has a U-shaped core 1.2.1, which lies within the yoke 1.1.1. This core 1.2.1 is made of a nonmagnetostrictive amorphous metal in certain preferred embodiments and has arm ends which also face the shaft. A cross-piece of the core 1.2.1 bears a coil 1.2.2 with electric connections 1.2.3, which are connected to an evaluation circuit 3. Both the permanent magnets 1.1.2, 1.1.3 and the arm ends of the core 1.2.1 are arranged a short distance from the shaft 2.

The shaft 2 bears coatings in the active area of the sensor system 1, in other words extending somewhat beyond the permanent magnets 1.1.2, 1.1.3 in the longitudinal direction of the shaft 2. A highly permeable, nonmagnetostrictive, amorphous third layer 2.3 is fixed directly on the shaft 2. On this third layer, a highly nonmagnetic second layer 2.2 is fixed. Finally, on the second layer 2.2, a highly soft magnetic, magnetostrictive, amorphous first layer 2.1 is fixed. Although not shown in the representation in FIG. 1, the layers 2.1–2.3 surround the shaft 2 over its entire circumference, as in FIGS. 2 and 3.

The third layer 2.3 short-circuits the basic magnetism of the shaft 2 in the active area of the sensor system 1, so that the magnetic flux $\phi_K$ resulting from the basic magnetism of the shaft can only run within the shaft 2 and the third layer 2.3. This is indicated by the solid line $\phi_K$ in FIG. 1.

The second layer 2.2 is for the magnetic decoupling of the third layer 2.3 and the first layer 2.1, while the first layer 2.1 is the actual measuring layer.

As can be seen from FIG. 1, a magnetic direct-current field is generated by the magnetic field generator 1.1 and is introduced into the first layer 2.1 (flux $\phi$), so that the magnetic circuit closes in the longitudinal direction of the shaft 2. If the shaft 2, and with it the layers 2.1-2.3, are then twisted, in the layer 2.1 there is a change in its magnetisation state, which results in a change in the magnetic flux $\phi$. Since the core 1.2.1 of the sensor 1.2 is likewise in the magnetic circuit, a change in the magnetic flux $\phi$ also results in a change in the magnetic flux $\phi_S$ in the core 1.2.1 of the sensor 1.2, to be precise in the following respect.

The coil 1.2.2 of the sensor is fed by a voltage source 3.1 of the evaluation circuit 3 at a constant frequency, for example an oscillator at 100 khz, whereby a certain alternating-current field is generated in the sensor 1.2 and the core 1.2.1 of the sensor 1.2 is controlled to saturation. Superimposed on this alternating-current field is a direct-current field component of the magnetic field generator 1.1.1, so that a change in the magnetic flux $\phi$ resulting from the direct-current field also induces a change in the magnetic flux $\phi_S$ that is related to the direct-current field component, in the core 1.2.1. This change in the magnetic flux $\phi_S$ effects in the core 1.2.1, via the non-linear function $B=f(H)$ of the magnetisation curve, a change in its dynamic permeability $\mu(H)=dB/dH$. Consequently, a change in the inductance L of the coil 1.2.2 is effected, which can be evaluated in a signal conditioning stage 3.2 of the evaluation circuit 3, for example a simple oscillator electronics unit, in such a way that a representation of an electrical voltage or frequency as a function of the torsion is achieved.

Figure 2:
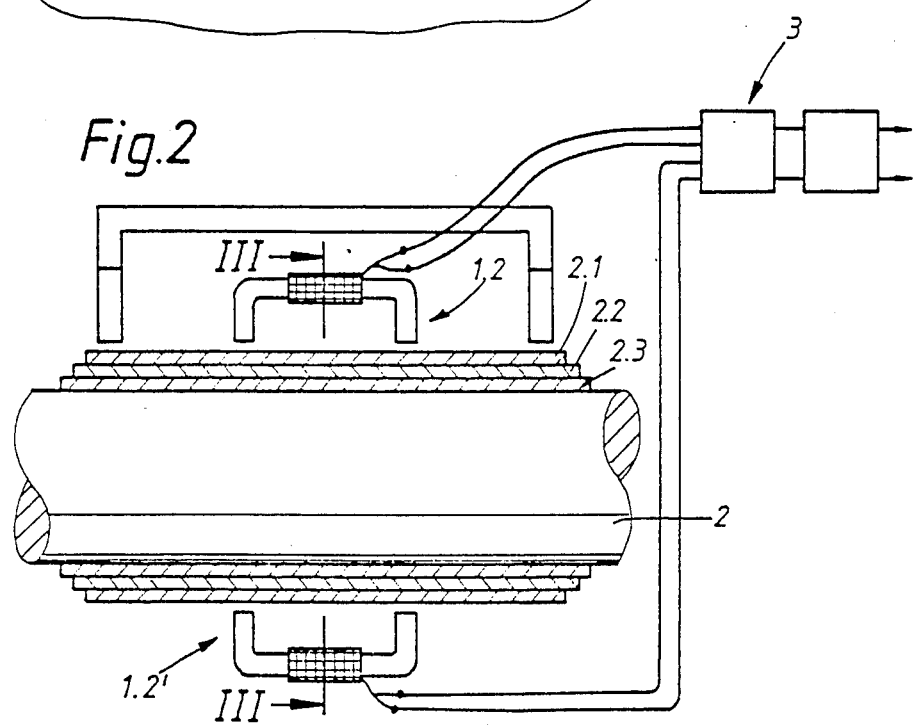
FIG. 2 is a diagrammatic representation of a further preferred embodiment of the present invention.
Figure 3:
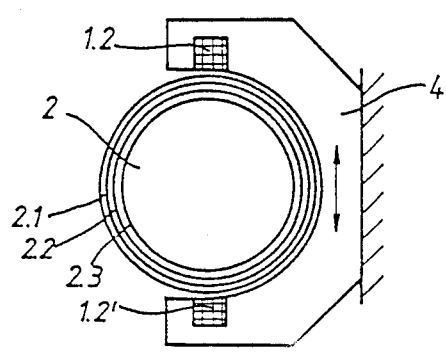
FIG. 3 is a cross-sectional side view according to the line III—III in FIG. 2.

In contrast to the preferred embodiment according to FIG. 1, in the further preferred embodiment shown in FIGS. 2 and 3, in addition to the sensor 1.2, there is 0 also a further, diametrically lying sensor 1.2' arranged at the shaft 2. Both sensors 1.2 and 1.2.' are connected via their connections to the evaluation circuit 3. In the evaluation circuit 3, the signals generated by the sensors are electronically added. This design allows the elimination of oscillations of the shaft in vertical direction and thereby resultant magnetic flux changes, while the useful signal is doubled.

As can be seen in particular in FIG. 3, since the sensors 1.2 and 1.2' are arranged diametrically opposite each other and in vertical direction, small oscillations of the shaft in horizontal direction do not have any effect on the signals generated by the sensors 1.2, 1.2' since the air gap between the sensors 1.2, 1.2' and the shaft 2 remains virtually constant.

If the sensors 1.2, 1.2' are also held by a carrier 4 which is displaceable in vertical direction, a null balance with respect to the signals generated by the sensors 1.2, 1.2' is achievable.

As far as the design of the sensor 1.2 and 1.2' is concerned, it must be pointed out that its scarcely temperature-dependent inductive resistance is chosen to be many times greater than its temperature-dependent ohmic resistance. A copper wire having a small thermal resistance coefficient, for example Thermosyn, is preferably used for the sensor coil 1.2.2, whereby possible temperature drifts can be kept very small.

In the simplest preferred embodiments, the layers 2.1-2.3 are three thin films, with a thickness of approximately 20-50 $\mu$m. These layers are joined to the shaft 2 and to one another by an adhesive technique or by explosion welding. However, it is also possible to obtain the sequence of layers with their specified physical Properties by various chemical or physical processes such as evaporation coating, sputtering, etc. or electrolytic depositions or chemical deposition reactions, or a combination of chemical coating process and physical process.

A chemical deposition process of nickel with a certain fraction of phosphor is particularly advantageous, the control of the phosphor fraction allowing layers to be produced which range in their magnetic properties from highly soft magnetic to highly nonmagnetic. With this process, it is then possible, by changing just a few parameters in the chemical deposition, to apply all three 2.1-2.3 layers to the shaft 2 successively. The molecular intermeshing of the individual layers means that no change in the mechanical and magnetic properties is expected under high dynamic loading over a very long time and a high adhesion of the layers 2.1-2.3 on the shaft 2 and to one another is achieved. In addition, owing to their surface structure, these layers 2.1-2.3 have no corrosion tendency, so that the magnetic and mechanical properties of these layers are stable for a very long time for this reason as well.

Thus, with the present invention, a device is provided which has a simple, sturdy mechanical design, which functions reliably and stably in the long term even in continuous operation under high mechanical alternating loads and under physically and chemically aggressive ambient conditions, and which makes it possible to process further the signal generated by the sensors in a simple, inexpensive electronic signal conditioning unit.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A device for the contactless indirect electrical measurement of torque at a shaft, having a sensor system which is arranged a small distance from said shaft, said sensor system having U-shaped magnetic field generator means and at least one sensor means having core means and coil means with electrical connections, and an evaluation circuit in which first said sensor means is integrated via said connections, said device comprising:
a plurality of coatings fixed on the shaft in the area of said sensor system wherein said coatings include:
a highly soft magnetic, magnetostrictive amorphous first layer for causing a-magnetic direct-axis field generated by said magnetic field generator means to be conducted in longitudinal direction of said shaft for closing of a magnetic circuit, said sensor means being arranged in the area of the direct-axis field conducted through said first layer and, upon torsion of said shaft, detecting a change in magnetisation in the first layer in a form of a change of a magnetic flux in said sensor core means, a second layer underlying said first layer and being highly nonmagnetic; and a highly permeable nonmagnetostrictive, amorphous third layer on which said second layer lies, said third layer being applied directly on said shaft, wherein said core means is in said magnetic circuit, and comprises nonmagnetostrictive amorphous metal; wherein said magnetic field generated by said magnetic field generator means is a direct-current field which is superimposed on an alternating-current field generated by said coil means when said coil means is excited, such that a change in said magnetic flux effects a change in dynamic permeability of said core means by a non-linear function $B=f(H)$ of a demagnetisation curve and is a consequence of an inductance of said coil means, said change being converted in said evaluation circuit into a torsion-analogous electrical signal.

2. A device according to claim 1, further comprising second sensor means arranged at said shaft which is diametrically opposite said first sensor means in vertical direction and which is integrated in said evaluation circuit via electrical connections.

3. A device according to claim 2, further comprising carrier means which is displaceable in vertical direction for carrying said first and second sensor means.

4. A device according to claim 1, wherein said three layers are applied to said shaft by a chemical deposition process of nickel and at least one fraction of at least one metalloid, and wherein said at least one fraction is varied in each of said three layers during said deposition process.

5. A device according to claim 4, wherein said at least one fraction is phosphor.

6. A device according to claim 4, wherein a plurality of fractions of metalloids are used in said chemical deposition process.

* * * * *